(12) United States Patent
Park et al.

(10) Patent No.: US 6,968,407 B2
(45) Date of Patent: Nov. 22, 2005

(54) SYSTEM AND METHOD FOR MANAGING CPCI BUSES IN A MULTI-PROCESSING SYSTEM

(75) Inventors: Woong Hee Park, Anyang-shi (KR); Sang Ic Jeong, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 349 days.

(21) Appl. No.: 10/317,134

(22) Filed: Dec. 12, 2002

(65) Prior Publication Data

US 2003/0115383 A1     Jun. 19, 2003

(30) Foreign Application Priority Data

Dec. 15, 2001  (KR)  .............................. 2001-79664

(51) Int. Cl.[7] ...................... G06F 13/362; G06F 13/00
(52) U.S. Cl. ...................... 710/110; 710/113; 710/301
(58) Field of Search .............................. 710/300–302, 710/110, 113, 115, 122, 104, 105

(56) References Cited

U.S. PATENT DOCUMENTS

| | | | |
|---|---|---|---|
| 4,375,639 A | * | 3/1983 | Johnson, Jr. ............. 340/825.5 |
| 6,161,197 A | * | 12/2000 | Lanus et al. ................. 714/11 |
| 6,209,051 B1 | * | 3/2001 | Hill et al. .................... 710/302 |
| 2003/0023802 A1 | * | 1/2003 | Ho et al. .................... 710/302 |
| 2003/0065861 A1 | * | 4/2003 | Clark et al. ................ 710/305 |

* cited by examiner

Primary Examiner—Khanh Dang
Assistant Examiner—Trisha Vu
(74) Attorney, Agent, or Firm—Fleshner & Kim, LLP

(57) ABSTRACT

The present invention relates to a system and method for managing Compact Component Interconnect (CPCI) buses in a multi-processing system. More particularly, the present invention improves performance and reliability of boards or systems using CPCI buses as the basic buses, by enabling all slots on a CPCI bus to function as system slots and thus obtaining the effect of parallel processing. The present invention makes it possible for all the slots on the CPCI bus of a board or system, which uses the CPCI buses as basic buses, to function as system slots. Thus, several boards of one and the same function may be applied to all the slots. As a result, the present invention improves performance through the effect of parallel processing effect may also improve the reliability through the flexible operation of the system slot over the related art.

21 Claims, 6 Drawing Sheets

SYSTEM AND METHOD FOR MANAGING CPCI BUSES IN A MULTI-PROCESSING SYSTEM

BACKGROUND OF THE INVENTION

1. Field of the Invention

The present invention relates to a system and method for managing the Compact Peripheral Component Interconnect (CPCI) buses in a multi-processing system, and more particularly to a system and method for improving performance by using multiple system slots on a CPCI bus in a multi-processing system.

2. Background of the Related Art

Generally, there are eight slots for the system clock of 33 MHz and five slots for the system clock of 66 MHz in the CPCI of the related art. Of these, the eight slots of 33 MHz will be explained in the following. As shown in FIG. 1, the related art standard CPCI buses each of which connects the eight slots by using the first pin (P1) or the second pin (P2).

Also, as shown in FIG. 1, one CPCI bus has eight slots (SLOT 0~SLOT 7) and signals related to the CPCI buses are connected respectively to P1 and P2 throughout the relevant slots (SLOT 0~SLOT 7). The third pin to the fifth pin (P3~P5) provide routes for signal transmission between the front card and the rear card. Sometimes, the fourth pin (P4) accommodates H.110 bus.

Accordingly, the system slot usually is either the leftmost slot or the rightmost slot. For example, the slot located at either end of the slots (SLOT 0 or SLOT 7) may be used as the system slot. Further, the location of the respective system slot pins of CPCI bus signals is previously determined. Because such location is different from the location of other slots (SLOT 1~SLOT 6), the system slot can not be changed once it is determined. Also, because only one slot is assigned as the system slot, there is only one system board on a CPCI bus. The other slots are peripheral slots and a variety of peripheral cards may be located at the peripheral slots according to various system structure requests.

Additionally, all bus arbitrations are conducted by the system board and all peripheral cards may transmit and receive messages only through the system board. For example, peripheral cards do not exchange messages directly among themselves. Also, bus requests from all of the slots and bus grants for all the relevant slots are concentrated on the system slot. Thus, in the related art, the system slot supplies clocks to all of the other slots and performs an interrupt process by receiving an interruption signal from the each relevant slot.

In the CPCI bus of the related art, as illustrated in FIG. 1, there is one system slot, on which all operations of the CPCI bus are concentrated. First, the system board accesses the configuration spaces of the peripheral boards of other slots and reads information regarding each peripheral board. Then, the system board activates the driver for each peripheral board based upon the information read with respect to each relevant peripheral board. All the peripheral slots are given relevant address areas on the CPCI bus according to the locations of the slots. Through this action, a peripheral board may recognize that it has been selected.

All the peripheral boards use a PCI bridge in order to map their local addresses to the address areas allotted on the Peripheral Component Interconnect (PCI) bus.

All operations on a CPCI bus are synchronized through the clock signal provided by the system board. Each of the peripheral boards may obtain the right to use the bus among all the boards on the CPCI bus through the bus request defined in accordance with the CPCI bus specification. Of all the boards on the CPCI bus, the system board takes the role of granting and arbitrating the bus occupancy, by responding to a peripheral board with bus grant signal with respect to a certain bus request. The system board grants the right to use the bus to the board of the slot requesting the bus occupancy.

Each peripheral slot has an interruption signal which has been determined by the CPCI specification. The PCI bridge is set for the assertion of interruption signals and for the system board's observation of the current interruption signal situation. Thus, upon the receipt of an interruption signal, the system board accesses the relevant address and determines the type of interruption.

Thus, in the mode of operations of the related art, because there is only one system board on one bus, it is difficult to satisfy the reliability standard required in a multi-processing system. More specifically, in the related art, the system board on a CPCI bus may not be extended because there is only one system board on one CPCI bus and because all the other slots are used for peripheral boards. Thus, if the system board is in an abnormal state, the other slave boards on the CPCI bus cannot discharge their functions accordingly.

Further, because the CPCI bus of the related art always has a certain number of slots assigned for slave boards, if there are only a few slave boards, there may be wasted space and thus the system integration may be degraded.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to solve the problem of related art by using the CPCI bus specification, to improve system capability through parallel processing and system reliability through flexible operation of the system slot, which are features required for a multi-processing system.

Another object of the present invention is to improve performance by using multiple system slots on CPCI buses in a multi-processing system. Specifically, by implementing the system slot whose location may vary on a CPCI bus and thus by making it possible for any of the boards to become the system board, which improves reliability and flexibility. Further, the present invention improves performance and flexibility through the parallel processing effect by making it possible for slots on a CPCI bus to exchange Inter Processor Communication (IPC) messages directly with other slots. Thus, the present invention satisfies the performance and stability conditions required for rapid changes of processors.

Another object of the present invention is to have all boards share one CPCI bus and to have such multiple system boards connected to one CPCI bus through the procedure of assigning the arbitration right to one board. Thus, if such multiple system boards are connected to one CPCI bus, even if the currently functioning system board experiences abnormal condition, one of the other boards may take the arbitration right and thus the other boards may continue operating in the pre-existing states.

Another object of the present invention is to achieve performance improvement by connecting boards in compliance with performance specifications required for a multi-processing system and to have the boards communicate with one another through the CPCI bus, thus, attaining the parallel processing effect.

In order to achieve the above objects in whole or in parts, there is provided a system and method for managing CPCI buses in a multi-processing system according to a preferred embodiment of the present invention including, implementing multiple system slots by enabling all slots on a CPCI bus to function as system slots, determining the system slot from the multiple system slots according to the connection status and the priority given to each slot, and conducting the CPCI bus arbitration and clock supply at the system board connected to the determined system slot.

If the system board, which has been connected to the determined system slot is disconnected, the method for managing CPCI buses in a multi-processing system according to the preferred embodiment of the present invention further comprises: determining the new system board at another board connected to a slot that has the highest priority among the other slots.

In order to enable all slots on the CPCI bus to function as system slots. The present invention preferably uses the software interruption of the Inter Processor Interrupt (IPI) method so that the interruption effect may be attained without regard to the relevant slots.

Preferably, the implementation of multiple system slots includes classifying pins of each slot on the CPCI bus into slot location information pins, board existence information pins, system slot information pins and arbitration and clock information pins and connecting the slots with one another through the relevant pins; implementing all slots to have separate pairs consisting of bus request and bus grant respectively for all the slots on the CPCI bus; constructing clock lines through which the board connected to the system slot may supply bus clock individually to all the other slots; and setting the priority based upon which the system slot is determined.

Preferably, the determination of the system slot from the multiple system slots includes, in the state where initial boards are connected to the multiple system slots, when the power is supplied, each board (subject board's) notifying the other boards of the subject board's connection status through the board existence information pin and confirming the other boards' connection status, determining whether the subject board is connected to the highest priority slot by reading its own slot location information through the slot location information pin, and, if the board is connected to the highest priority slot, determining whether it will function as the system board and notifying the other boards of such determination through the system slot information pin.

Alternatively, the subject board is not connected to the highest priority slot, the determination of the system slot from the multiple system slots further comprises: checking whether notification from the system board has been received within a certain period of time; and, if no notification from the system board has been received, confirming whether the subject board is connected to the next highest priority slot, determining whether it will function as the system board and notifying the other boards of the determination through the system slot information pin.

The determination of the system slot from the multiple system slots further comprises, in a case where a board (subject board) is connected to an empty slot while the power is supplied: the subject board's reading its own slot location information through the slot location information pin; notifying the other boards of the subject board's connection status through the board existence information pin and confirming the other boards' connection status; checking whether notification from the system board has been received through the system slot information pin within a certain period of time; and, if no notification from the system board has been received, determining whether the subject board will function as the system board and notifying the other boards of the determination through the system slot information pin.

The determination of the system slot from the multiple system slots further comprises, if notification from the system board has been received, receiving the control regarding the bus occupancy from the system board through the signals assigned to the subject board and maintaining the signals assigned to the other slots in the high impedance condition.

Preferably, the CPCI bus arbitration and clock supply comprises: blocking at each board (subject board) arbitration signal and clock signal lest that such signal should be transmitted to the other slots before the functions of the boards connected to slots on the CPCI bus are determined; checking whether the subject board is the system board and, if it is the system board, disabling arbitration signal and clock signal corresponding to its own slot number lest that such signal should be used; and conducting the arbitration at the system board by controlling arbitration signals transmitted to the other slots and transmitting clock signals so that the boards at the other slots may use the bus.

Alternatively, if the subject board is not the system board, the CPCI bus arbitration and clock supply comprises enabling arbitration signal and clock signal corresponding to the subject board's slot number so that such signal may be used and, at the same time, maintaining arbitration signals and clock signals corresponding to the other slot numbers to be in high impedance condition.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
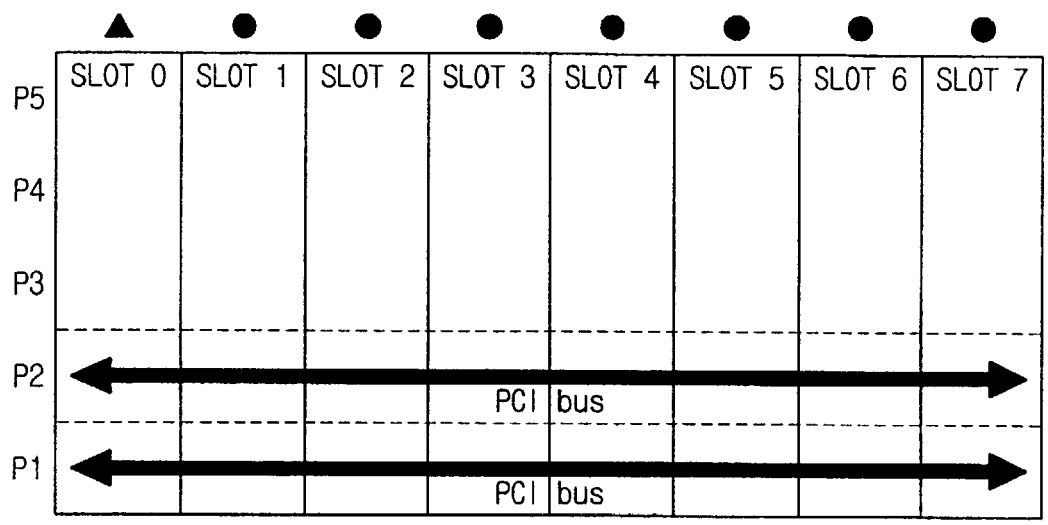
FIG. 1 illustrates a general CPCI bus of the related art.
Figure 2:
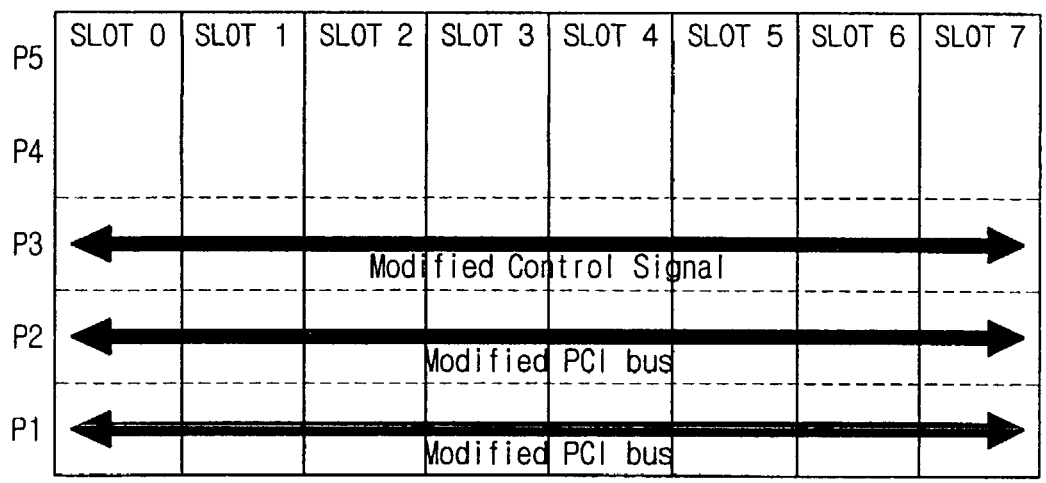
FIG. 2 illustrates a modified CPCI bus according to a preferred embodiment of the present invention.

As shown in FIG. 2, the related art includes a modified CPCI bus, which transmits using the third pin (P3), signals that are not used in the first pin (P1) or the second pin (P2) on a general CPCI bus. Also, other required signals are transferred on such modified CPCI bus.

Also, as shown in FIG. 2, the basic CPCI bus specification is adopted in the present invention. One difference between the present invention and the general CPCI bus system is that there are no specific boards that are characterized as peripheral boards. Thus, in a preferred embodiment of the present invention, all the peripheral functions are already implemented in one board and signals for interfacing external systems are transferred to the rear card through the third, fourth and/or fifth pins (P3 to P5).

Further, in a preferred embodiment of the present invention, in order to improve performance, system reliability and system integration degree, the above-described boards of the present invention are installed in the slots (SLOT 0~SLOT 7). Here, because not all of such boards may supply clocks for the CPCI bus operation or arbitrate the bus occupancy as system boards at one time, one of the boards is selected to function as the system board. Such one board supplies the clock on the CPCI bus and arbitrates the bus occupancy.

Preferably, any of the slots (SLOT 0~SLOT 7) may become the system slot. Accordingly, all slots (SLOT 0~SLOT 7) have the capability of functioning as the system slot. Further, separately from the function of CPCI bus arbitration, the bus may be operated from a certain board to other boards. In this manner, messages may be transmitted and received among all the slots (SLOT 0~SLOT 7). Based upon this structure, the present invention implements the IPC, which achieves the parallel processing effect, this improving system reliability and system integration.

Additionally, in a preferred embodiment of the present invention, there is a unique bus request signal and bus grant signal system for arbitration on bus occupancy based upon the general CPCI bus structure. As described in related art, interruption signals that have been concentrated on a system slot use the hardware line. Such interruption signals using hardware line are not suitable for the present invention which enables all slots to function as system slots. Thus, the present invention adopts software interruption of the IPI method. Preferably, the present invention implements the interruption effect regardless of the relevant slots.

According to the preferred embodiment of the present invention, among all the slots, only one slot functions as the system slot at a given time. Thus, the present invention includes a procedure to determine which slot will function as the system slot, supplying the operation clock for the CPCI bus and arbitrating the bus occupancy.

Additional information regarding a method for managing CPCI buses in a multi-processing system according to a preferred embodiment of the present invention is next provided.

Figure 5:
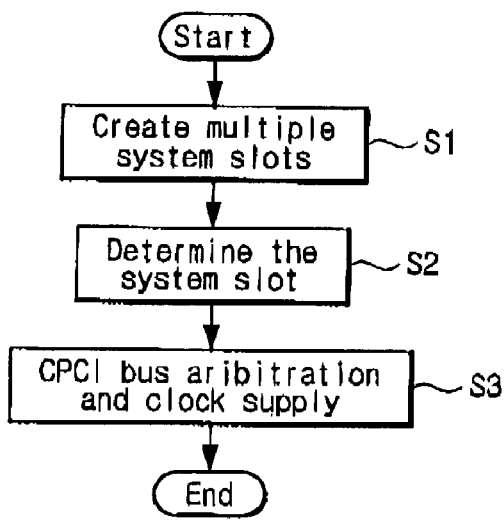
FIG. 5 is a flow chart illustrating a method for managing CPCI buses in a multi-processing system according to a preferred embodiment of the present invention.

As shown in the flow chart of FIG. 5, in order to improve system reliability and integration degree as required in a multi-processing system, while adopting the pre-existing advantages of the CPCI bus system, the present invention builds the structure for multiple system slots, wherein any slot on a CPCI bus may function as the system slot, step S1.

Such structure is implemented by connecting multiple boards that may work as system slots to the slots on the CPCI bus. In this manner, all slots on the CPCI bus may become system slots and several boards of one and the same function may be applied to all the relevant slots. Consequently, the system's performance and reliability may be improved through the resulting parallel processing effect.

Then, the slot which will function as the system slot (i.e., the slot that will function as a CPCI bus arbitrator and supplier of the CPCI bus clock) is determined among the multiple system slots implemented in the step S1, based upon the connection status of the boards and relevant priority, as shown in step S2.

The board that is connected to the system slot, determined in step S2, becomes the system board and thus receives clock signal and bus request signal from each of the slots and, by conducting the arbitration, transmits bus grant signal to the slot that will have the bus occupancy and distributes the bus clock. In other words, the system board determined in the above-described manner conducts the function as a CPCI bus arbitrator and a supplier of the CPCI bus clock (S3).

If the board which has been determined to be the system board in the step S2 is disconnected, becomes inoperable, or otherwise inactive, among the other boards currently connected to the other slots, the board which has the highest priority becomes the system board.

Figure 3:
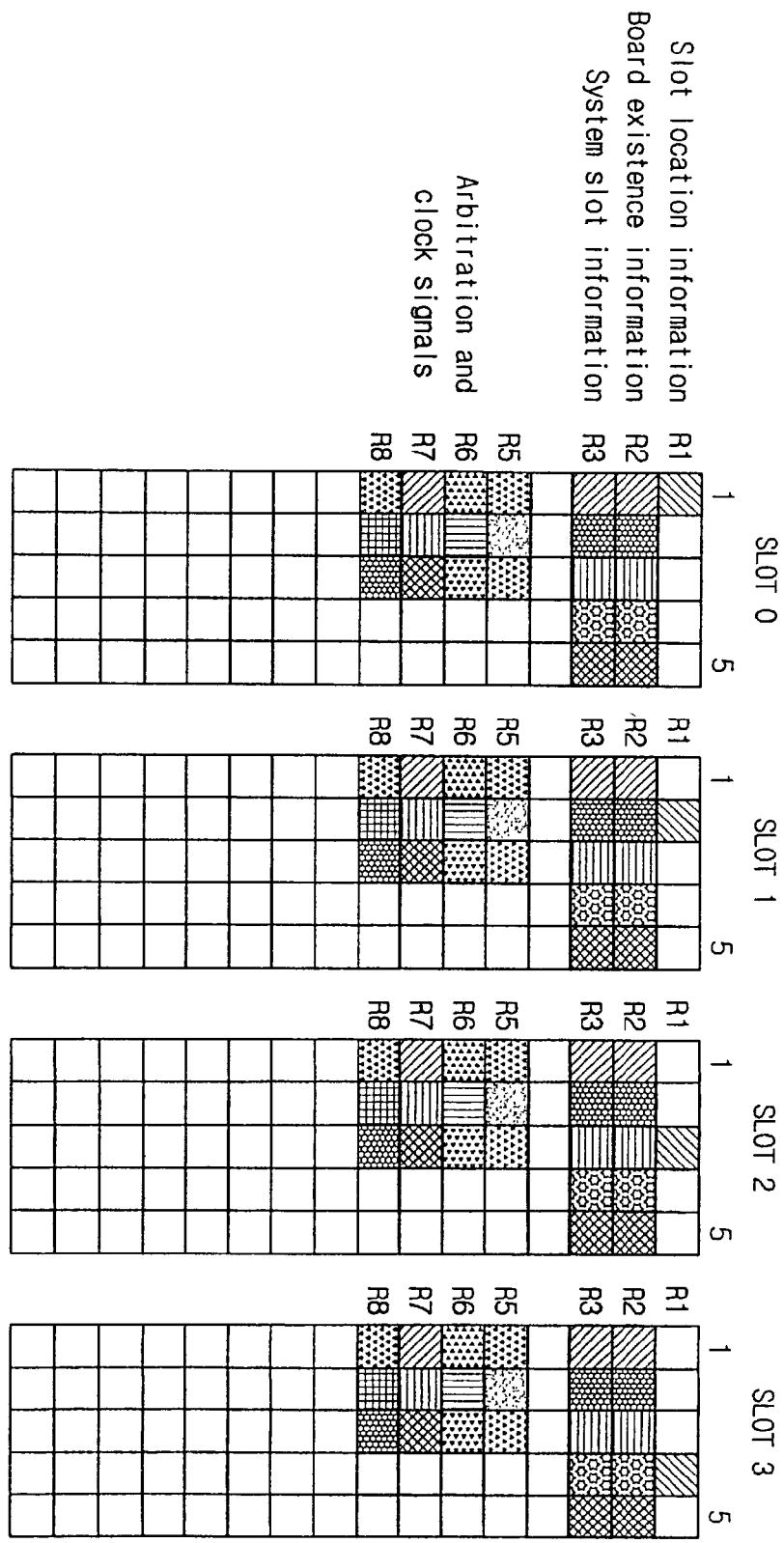
FIG. 3 illustrates the location of pins of the slots of the modified CPCI bus according to a preferred embodiment of the present invention.
Figure 6:
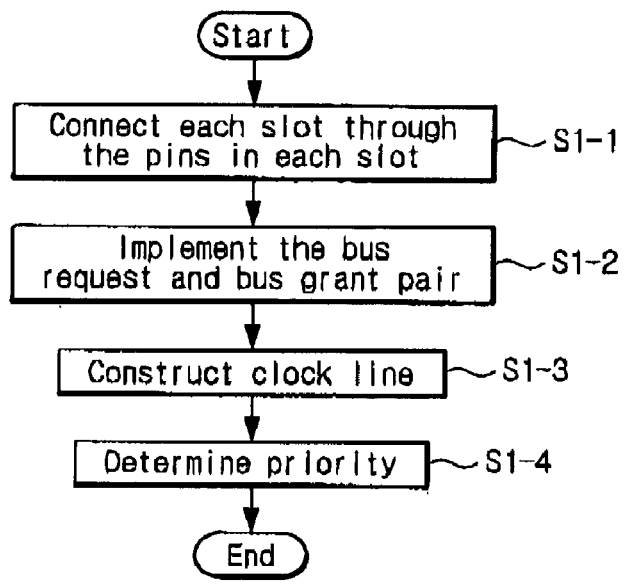
FIG. 6 is a flow chart illustrating the step of implementing multiple system slots according to a preferred embodiment of the present invention.

Additional information regarding step S1 of implementing system slots, is next provided. As shown in the flow chart of FIG. 6, for implementing multiple system slots, pins of slots may be located as shown in FIG. 3. The pins of the CPCI slots are arranged as illustrated in FIG. 3 and then the multiple system slots (SLOT 0~SLOT 3) are connected with one another through the relevant pins.

For example, FIG. 3 illustrates the pin arrangement in a case where four (4) multiple system slots are used in connection with a CPCI bus. Even though the following description explains a preferred embodiment using four (4) multiple system slots, the present invention is not limited to such preferred embodiment. Rather, the present invention may also be applied to eight (8) or more multiple system slots in connection with the system clock of 33 MHz and other feasible embodiments of the method described herein.

Referring to FIG. 3, the first row (R1) contains slot location information signal notifying the connected board of the slot's location. When boards are connected to multiple system slots (SLOT 0~SLOT 3), each of the boards may recognize location of the slot to which it is connected by checking the signal contained in the first row (R1).

The second row (R2) contains the board existence information signal notifying the other boards connected to the other slots that there exists a board (to which such signal is related) connected the subject slot. The pins, as illustrated in FIG. 3, as having the same figures are connected with one another. For example, when a board is connected to the first slot (SLOT 0), the signal of a specific pin located in the second row and in the first column of SLOT 0 (i.e., Pin (1, R2) represented in the x and y coordinates) notifies the other boards connected to the other slots (SLOT 1~SLOT 3) that a board is connected to the first slot (SLOT 0).

The third row R3) contains the system slot information signal notifying the other boards connected to the other slots whether the subject board functions as the system board and as the bus arbitrator. The pins illustrated in FIG. 3 as having the same figures are connected with one another. For example, if the board connected to the first slot (SLOT 0) functions as an arbitrator, such fact is notified to the other boards connected to the other slots (SLOT 1~SLOT 3) through the specific pin located in the third row and in the first column of the first slot (SLOT 0) (i.e., Pin (1, R3)).

The fifth row (R5) and the other rows contain arbitration signals for bus occupancy arbitration, for example, bus request signal, bus grant signal, and clock signals. The pins, illustrated in FIG. 3, are connected with one another.

Accordingly, the pins of the multiple system slots (SLOT0~SLOT3) are classified into pins of the first row (R1) for transmitting the slot location information signal, such as slot location information pin. Pins of the second row (R2) for transmitting the board existence information signal, such as board existence information pins. Pins of the third row (R3) for transmitting the system slot information signal, such as system slot information pin. Finally, pins of the fifth row (R5) and the others for transmitting the arbitration signal and clock signal, such as arbitration and clock related information pins. Then, the multiple system slots (SLOT 0~SLOT 3) are connected with one another through each of the relevant pins other than the pins of the first row (R1). In this manner, the board existence information signal, the system slot information signal, the arbitration signal, and clock signal are transmitted and received among the multiple system slots (SLOT0~SLOT3) (S1-1).

Figure 4:
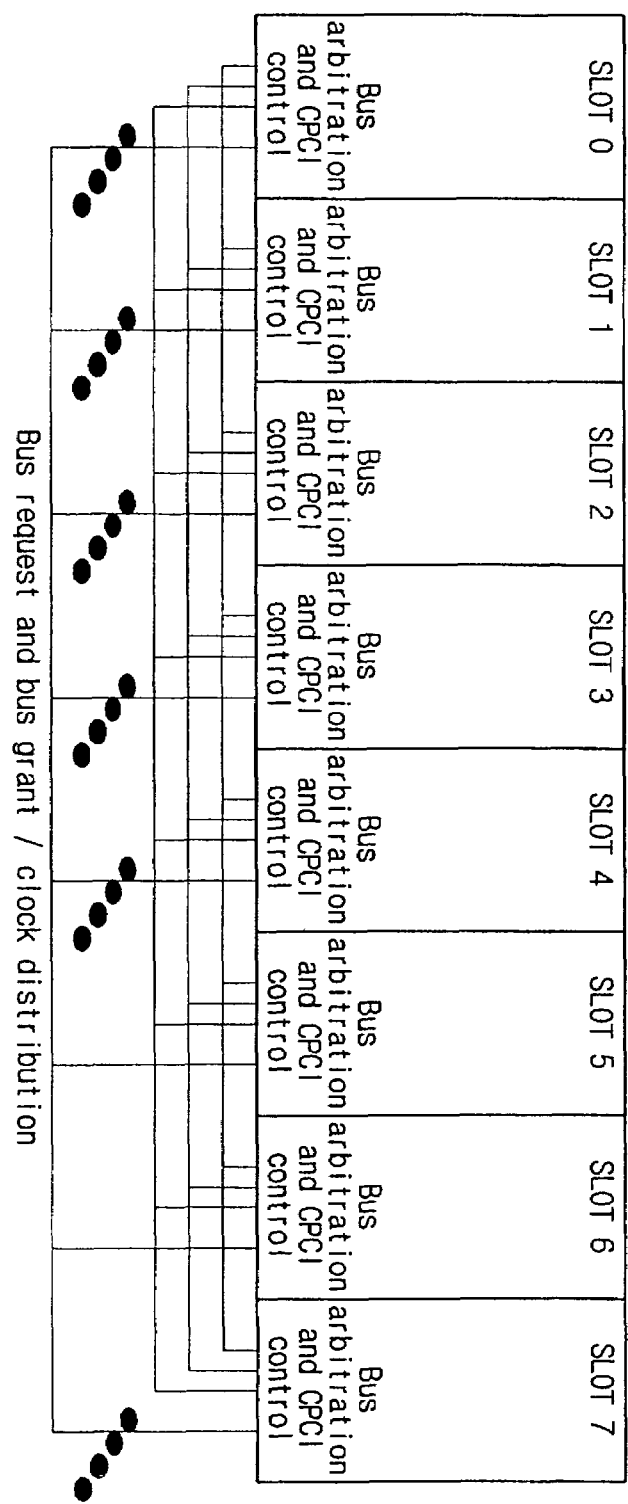
FIG. 4 illustrates signals communicated through the modified CPCI bus according to a preferred embodiment of the present invention.

As illustrated in FIG. 4, each of the boards connected to each of the relevant slots (SLOT 0~SLOT 7) are designed to enable only the signals related to its function and to disable the other signals. Thus, each board does not affect the other boards connected to the other slots.

Additional information regarding signals exchanged through the modified portion of the modified CPCI bus of the preferred embodiment of the present invention is next provided. As shown in FIG. 4, each slot is implemented to accommodate the bus request and the bus grant (constituting a pair) from and to each of all the other slots separately. In other words, each of the slots (SLOT 0~SLOT 7) has a pair of such bus request and bus grant separately for each of the slots implemented in the present invention (S1-2).

Also, clock lines are connected, as illustrated in FIG. 4, so that the system board connected to the slot selected from all the slots (SLOT 0~SLOT 7) as the system slot may supply bus clock individually to the other boards connected to the other slots (S1-3).

As described above, all slots (SLOT 0~SLOT 7) are implemented to share the board existence information signal notifying the connection status of each of the slots and the system slot information signal of each of the slots, as illustrated in FIG. 4. Further, the priority, based upon which the system slot is determined among all the slots, is set in a manner that the leftmost or the rightmost slot has the highest priority, as shown in step S1-4. Thus, a board connected to each of the slots (SLOT 0~SLOT 7) may, by detecting the board existence information signals and the system slot information signals, recognize whether a board of a higher priority has been connected and is functioning as the system board. Then, according to the signals of such higher-priority board, if any, each board may determine whether it takes the role of the system board or not. In the above-described manner, the function as the system board may be assigned to the relevant board corresponding to the connection status of boards on the slots.

However, even though a board is newly connected to a slot having a high priority over the current system slot, the role of the system slot should not change. The data loss that may occur at the time of disconnection of the system board from the system slot will not be considered in this description.

Figure 7:
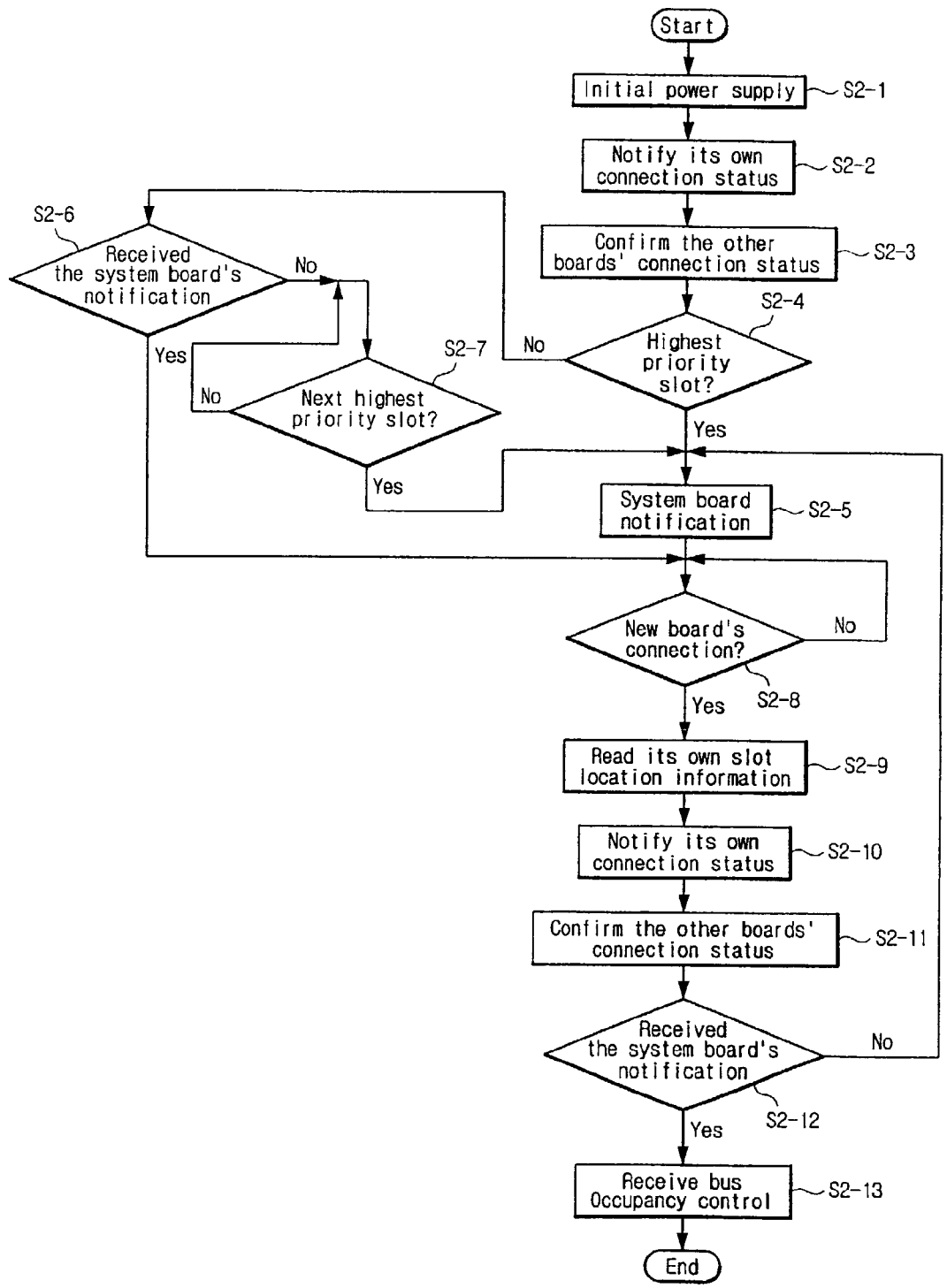
FIG. 7 is a flow chart illustrating the step of determining the system slot according to a preferred embodiment of the present invention.

Next, the step (S2) of determining the system slot will now be described with reference to the flow chart shown in FIG. 7. As shown in FIG. 7, the power is supplied to the multiple system slots with the initial boards implemented through the above-described first step (S1) (S2-1). In this state, the first slot (SLOT 0) or the eighth slot (SLOT 7) has the highest priority because the highest priority has been given to the leftmost or the rightmost slot in the above-described first step (S1).

Each board connected to each of the slots (SLOT 0~SLOT 7) notifies the other boards that the subject board (itself has been connected, by transmitting its board existence information signal to the other boards through the board existence information pin illustrated in FIG. 3 (S2-2). At the same time, each board receives board existence information signals from the other boards and thus recognizes which other boards are connected (S2-3).

Also, each board connected to each of the respective slots (SLOT 0~SLOT 7) reviews the slot location information signal through the slot location information pin illustrated in FIG. 3 and thus reads the slot location information of itself. In this manner, each slot checks whether it is connected to the slot with the highest priority (S2-4).

If it is determined at the step 2-4 (S2-4) that the subject board is connected to the highest priority slot, for example, the first slot (SLOT 0) or the eighth slot (SLOT 8), the board in such slot of the highest priority transmits to the other boards the system slot information signal notifying that it will function as the system board through the system slot information pin shown in FIG. 3. Thus, the other boards are notified that the above-mentioned board (i.e., subject board) will function as the system board in charge of the arbitration (S2-5).

If it is determined at step S2-4 that the subject board is not connected to the slot of the highest priority, then the board waits to receive notification from a board of the highest priority. Other such boards do the same. Preferably, each board waits for a certain period ("Wait Time") and then checks whether the board of the highest priority asserts its function as the system board. In other words, each board checks whether the system slot information signal has been received from the board of the highest priority slot through the system slot information pin shown in FIG. 3 while the above-mentioned Wait Time passes (S2-6).

If no system slot information signal has been received within the Wait Time, each board checks whether it is connected to a slot of the next highest priority, step S2-7 and then determines whether it will function as the system slot through the above-described step 2-5 (S2-5).

If, at the time when a board with the next priority determines to function as the system board after waiting for the Wait Time, the board with the highest priority asserts that it will be the system board, then the board with the higher priority becomes the system board.

Thereafter, if a board is connected to an empty slot while the power is supplied ordinarily (S2-8), then the board connected to such slot reads its slot location information from the slot location information signal detected through the slot location information pin shown in FIG. 3 (S2-9).

Then, the board connected to said empty slot transmits its board existence information signal to the other boards through the board existence information pin shown in FIG. 3. Thus, it informs the other boards that it has been connected (S2-10) and, at the same time, receives the board existence information signals from the other boards and confirms which other boards are installed (S2-11).

Thereafter, the board connected to said empty slot checks, for the Wait Time, whether any system slot information signal is received from another board through the system slot information pin shown in FIG. 3 and thus determines whether there is a board asserting its role as the system slot (S2-12).

If it is determined at the step 2-12 (S2-12) that there is a system slot board (i.e., if the board recently connected to the empty slot received the system slot information signal through the system slot information pin shown in FIG. 3 from another board), the board connected to the empty slot receives the bus occupancy control from the system board through signals communicated via its slot. At this time, the signals corresponding to the other slots are made to remain in high impedance state (S2-13).

Alternatively, if it is determined at the step 2-12 that there is no board asserting its role as the system slot (i.e., if no system slot information signal has been received through the system slot information pin shown in FIG. 3), the board connected to said empty slot conducts the step 2-5 (S2-5) to determine whether it itself will function as the system board and then transmits its own system slot information signal through the system slot information pin shown in FIG. 3. Thus, the board informs the other boards that it will be the system board in charge of the arbitration. Accordingly, this board drives arbitration and clock signals for the other slots and controls the bus occupancy.

Figure 8:
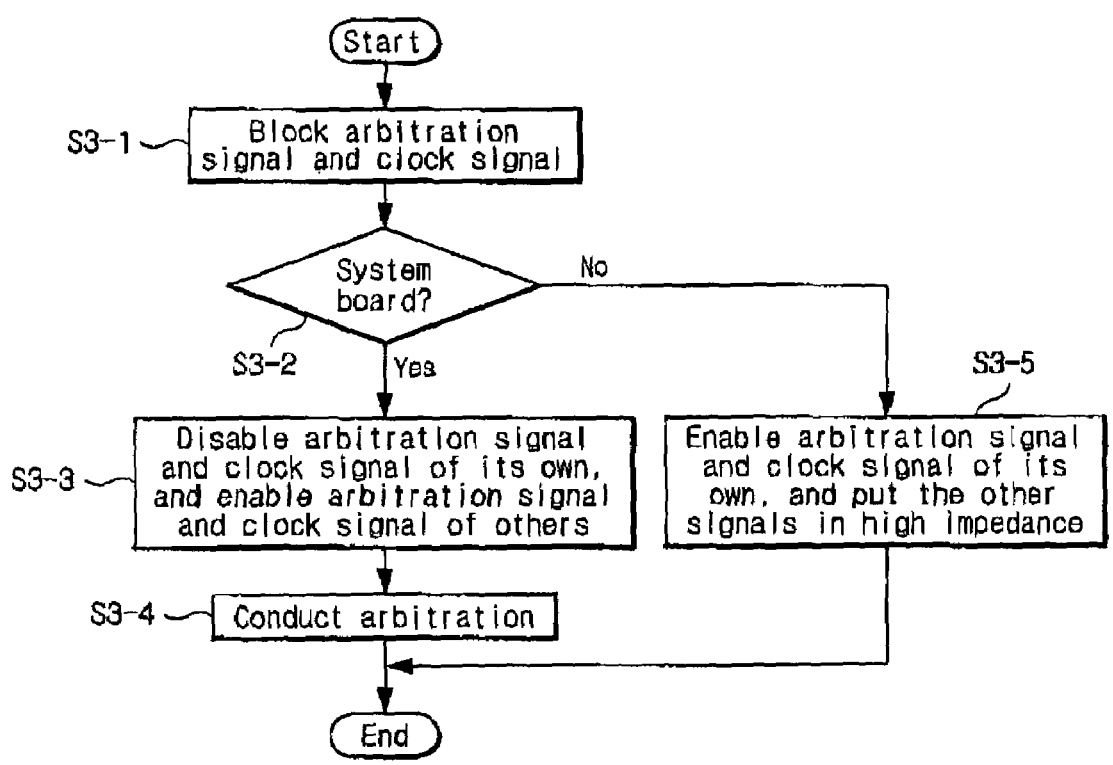
FIG. 8 is a flow chart illustrating the step of performing the CPCI bus arbitration and clock supply according to a preferred embodiment of the present invention.

Third, a detailed description will be given as to the above-mentioned third step (S3) of conducting the CPCI bus arbitration and clock supply with reference to a flow chart in FIG. 8.

When a board wishes to occupy the bus, the board asserts a bus request. Other boards that wish to occupy the bus do the same. The board on the system slot in charge of the bus arbitration responds to the bus request through the act of bus grant. A board which occupies the bus in this manner may communicate with any slot by using the PCI address area given to each slot. Thus, boards in all of the slots may transmit and receive IPC messages to and from other slots. Accordingly, the parallel processing effect may be achieved. Further, because multiple boards may be accommodated by one bus, the system integration degree may be heightened. Preferably, interruption signals do away with the conventional hardware signals and issue interruption from a slot to another slot by using the Inter Processor Interrupt (IPI).

Specifically, until roles of the boards connected to the slots (SLOT 0~SLOT 7) are determined, arbitration signal and clock signal used for bus occupancy control are blocked lest that such signals should be transmitted to other slots through the back board (S3-1).

Then, as with the second step (S2), each board checks whether it is a board that will function as the system board or not (S3-2). If it is determined that a board functions as the system board, such board disables arbitration signal and clock signal corresponding to its own slot number (S3-3). The state transition that occurs at this time is disregarded.

Thus, the system board disables the pair consisting of bus request and bus grant for its own slot number and enables clock signals for all the other slots except for the clock signal for its own slot. In this manner, the system board controls arbitration signals for the other slots, conducting the arbitration so that the boards on the other slots may use the bus (S3-4).

Other boards connected to the other slots (other than the system slot) enable arbitration signals and clock signals corresponding to their respective slot numbers. Each of such board maintains arbitration signals and clock signals for the other slots to be in the high impedance state lest that signals transmitted to the other slots should be interfered (S3-5).

Thus, each of the boards connected to the non-system slots enables the pair consisting of bus request and bus grant for its own slot number and enables the clock signal for its own slot number in order to receive the bus clock from the system slot.

Accordingly, any slot among the eight slots (SLOT 0~SLOT 7) may become the system slot according to the above-described process and bus right control signals and clock signals for all of the slots (SLOT 0~SLOT 7) are concentrated to the system slot. Consequently, the system slot selected among all of the slots supplies bus clocks and conducts arbitration for the bus occupancy.

As described above, according to the preferred embodiment of the present invention, multiple system boards may be connected to one CPCI bus by having one board hold the right to conduct arbitration for the CPCI bus and having all the boards share the one CPCI bus. In this structure where the scheme of distributing the arbitration right to one board, multiple system boards having one and the same function may be connected to one CPCI bus. Thus, even if the board which has held the bus arbitration right experiences certain abnormal condition, another board may hold the arbitration right instead through the above-described process of taking the arbitration right and thus the other boards may remain in normal operation state. Resultantly, the overall system reliability may be improved.

In order to achieve the above objects, in whole or in parts, there is provided modified CPCI buses, which can enable all slots on a CPCI bus to function as system slots. Preferably this is done through the method determining the holder of CPCI bus arbitration right, allocation of signals for arbitration of bus occupancy and through the allocation of signals for bus clock distribution according to variable system slots. Consequently, the present invention may improve the performance, reliability and integration degree of the relevant system, over the related art.

Further, according to the present invention, boards may be installed in compliance with the specifications required for a multi-processing system and such installed boards may communicate with one another through the CPCI bus. Therefore, the parallel processing is adopted in the present invention and accordingly the performance of the system is improved over the related art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for managing Compact Peripheral Component Interconnect (CPCI) in a multi-processing system, comprising:
    enabling a plurality of slots on a CPCI bus;
    selecting a first one of the plurality of slots as a system slot based on a connection status and a priority of each of the slots; and
    conducting the CPCI bus arbitration and supplying a clock signal from a first board connected to the system slot, wherein any slot of the plurality of slots can be selected as the system slot.

2. The method of claim 1, wherein an Inter Processor Interrupt (IPI) operation is used to cause the plurality of slots to function as system slots, so that an interruption effect may be attained without regard to relevant slots.

3. The method of claim 1, wherein if the first board is connected from the system slot, said method further comprises:
selecting as a system slot a second one of the plurality of slots that has a highest priority among the plurality of slots.

4. The method of claim 1, wherein the enabling step includes:
classifying a plurality of pins of each of the plurality of slots on the CPCI bus into at least one slot location information pin, a board existence information pin, a system slot information pins and an arbitration and a clock information pin, and connecting the plurality of multiple system slots with one another through the relevant pins;
implementing the plurality of slots to have separate pairs including a bus request and a bus grant respectively for the slots on the CPCI bus;
constructing clock lines through which the board connected to the system slot supplies a bus clock to each of the plurality of slots; and
setting priority of each of the slots.

5. The method of claim 1, wherein the selecting step includes:
determining whether the first board is connected to a highest priority slot by reading the information from a slot location information pin of the first board; and
if the first board is connected to the highest priority slot, notifying at least a board inserted into a second slot that the first board is the system board.

6. The method of claim 5, wherein, if the first board is not connected to the highest priority slot, then:
checking whether notification of the connection status the first board has been received by at least the board in the second slot within a certain period of time;
if no notification from the first board has been received, confirming whether another board is connected to the next highest priority slot; and
determining whether the first board will function as the system board and notifying the plurality of boards of the determination through the system siot information pin.

7. The method of claim 5, wherein if the first board is connected to an empty slot while the power is supplied:
reading the first board's slot location information through the slot location information pin;
through the notifying at least the board in the second slot of the first board's connection status board existence information pin;
checking whether notification from the first board has been received through the system slot information pin within a certain period of time; and
if no notification from the first board has been received, determining whether the board will function as the first board and notifying at least the board in the second slot of the determination through the system slot information pin.

8. The method of claim 7, wherein if notification from the first board has been received, then:

receiving control information regarding bus occupancy from the first system board through a plurality of signals assigned to the first board; and
maintaining the plurality of signals assigned to the plurality of slots in a high impedance condition.

9. The method of claim 7, wherein if the first board is connected to an empty slot while the power is supplied:
reading the first board's own slot location information through the slot location information pin;
notifying at least the board in the second slot of the first board's connection status through the board existence information pin;
checking whether notification from the first board has been received through the system slot information pin within a certain period of time; and
if no notification from the first board has been received, confirming whether the first board will function as a system board and notifying at least the board in the second slot of the determination through the system slot information pin.

10. The method of claim 1, further comprising:
when power is supplied, notifying boards in the plurality of slots of the first board's connection status through a board existence information pin;
determining whether the first board is connected to a highest priority slot by reading the first board's slot location information through a slot location information pin;
if the board is not connected to the highest priority slot, checking whether notification from the first board has been received through a system slot information pin within a certain period of time; and
if no notification from the first board has been received, confirming whether the first board is connected to a next highest priority slot, and then determining whether another board will function as the system board and notifying at least the board connected to the second one of the slots of the determination through a system slot information pin.

11. The method of claim 1, further comprising:
blocking at the first board an arbitration signal and a clock signal so that the arbitration and clock signal should be transmitted to plurality of slots before the functions of a plurality of boards connected to slots on the CPCI bus are determined;
checking whether the first board is the system board, and if it is the first system board, disabling the arbitration signal and the clock signal corresponding to the first board's slot number so that the arbitration signal and clock signal can be used; and
conducting an arbitration at the first board by controlling the arbitration signals transmitted to the plurality of slots and transmitting the clock signals so that the plurality of boards at the plurality of slots may use the bus.

12. The method of claim 11, wherein, if the first board is not the system board, then:
enabling the arbitration signal and the clock signals while corresponding to the first board's slot number so that the arbitration signal and clock signal may be used while maintaining the arbitration signals and the clock signals corresponding to the plurality of slots numbers to be in a high impedance condition.

13. A method for managing Compact Peripheral Component Interconnect (CPCI) buses in a multi-processing system comprising:

implementing a plurality of multiple system slots by enabling all slots on a CPCI bus to function as a plurality of system slots, selecting one of the slots to be an operating system slot and notifying the other slots about what slot is the operating system slot; and selecting any one of the other slots to be the operating slot when the first selected slot is not properly operating;

determining the plurality of system slots from the plurality of multiple system slots according to a connection status and a priority given to the plurality of slots: and conducting a CPCI bus arbitration and a clock supply at a first system board connected to a determined system slot.

14. A multi-processing system comprising:

a Compact Peripheral Component Interconnect (CPCI) bus; and multiple system slots on the CPCI bus, wherein each of the multiple system slots are configured to function as system slots such that any one of the multiple slots can be selected as an operating system slot, wherein the multi-processing system is configured to determine a system slot from the plurality of multiple system slots according to a connection status and a priority given to each slot.

15. The system of claim 14, wherein a software interruption of an Inter Processor Interrupt (IPI) method is used for the implementation of all slots on the CPCI bus configured to function as system slots, so that the interruption effect may be attained without regard to relevant slots.

16. The system of claim 14, wherein the first system board configured to conduct a CPCI bus arbitration in a clock supply, wherein the system board is connected to a determined system slot.

17. The system of claim 16, wherein the first system board is further configured to determine that the system slot is disconnected and determining a second system board at another board connected to a slot that has the highest priority among the other slots.

18. The system of claim 14, comprising an information pin, a board existence information pin, an arbitration and clock information pin, all configured to connect the plurality of multiple system slots with one another.

19. A method for controlling a CPCI bus, comprising:

providing a CPCI bus having a plurality of slots;

determining a connection status and a priority for each of said slots; and selecting a first one from any one of said plurality of slots as a system slot based on a result of the determining step;

wherein the selecting step includes: determining priorities for respective ones of said slots; and selecting said system slot having a highest priority and a connected-board status.

20. The method of claim 19, wherein a board inserted into the system slot arbitrates the bus and supplies a clock signal for boards inserted in remaining ones of the slots.

21. The method of claim 19, further comprising:

detecting a fault condition relating to the first slot; determining a priority and connection status of remaining ones of said slots; and selecting from said remaining ones of said slots a slot having a highest priority as a new system slot.

* * * * *